(12) United States Patent
Miller et al.

(10) Patent No.: US 11,783,115 B1
(45) Date of Patent: Oct. 10, 2023

(54) HYPERLINK COPYRIGHT INFRINGEMENT AVOIDANCE

(71) Applicant: International Business Machines Corporation, Armonk, NY (US)

(72) Inventors: Grant Douglas Miller, Arvada, CO (US); Jeremy R. Fox, Georgetown, TX (US); Alan Chung, Hopewell Junction, NY (US); Mauro Marzorati, Lutz, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/936,893

(22) Filed: Sep. 30, 2022

(51) Int. Cl.
*G06F 40/134* (2020.01)
*G06F 40/166* (2020.01)
*G06F 21/10* (2013.01)

(52) U.S. Cl.
CPC .......... *G06F 40/134* (2020.01); *G06F 40/166* (2020.01); *G06F 21/10* (2013.01)

(58) Field of Classification Search
CPC ....... G06F 40/134; G06F 40/166; G06F 21/10
See application file for complete search history.

(56) References Cited

U.S. PATENT DOCUMENTS

| | | | | |
|---|---|---|---|---|
| 6,684,254 | B1 * | 1/2004 | Dutta | G06F 16/955 707/E17.112 |
| 9,154,491 | B1 * | 10/2015 | Leske | H04L 63/08 |
| 9,215,243 | B2 * | 12/2015 | Bommireddipalli | G06F 40/134 |
| 9,449,050 | B1 * | 9/2016 | Molina | G06F 16/24578 |
| 10,275,535 | B1 * | 4/2019 | Trauth | G06F 16/24556 |
| 11,347,929 | B1 * | 5/2022 | Lee | H04L 51/52 |
| 2001/0041989 | A1 * | 11/2001 | Vilcauskas, Jr. | G06Q 50/184 709/200 |
| 2007/0078773 | A1 * | 4/2007 | Czerniak | G06Q 30/00 705/57 |
| 2008/0275763 | A1 * | 11/2008 | Tran | H04N 21/8358 705/1.1 |
| 2008/0282159 | A1 * | 11/2008 | Vanderwende | G06F 16/345 707/999.001 |
| 2009/0204580 | A1 * | 8/2009 | Seamon | G06F 16/951 715/764 |

(Continued)

FOREIGN PATENT DOCUMENTS

| | | |
|---|---|---|
| JP | 3961099 B2 | 8/2007 |
| WO | 2008046252 A1 | 4/2008 |

OTHER PUBLICATIONS

Carbone, "EU copyright law may force Google, Facebook to pay billions to music companies, publishers," published Sep. 19, 2018, accessed Jul. 18, 2022, 2 pages. https://www.foxnews.com/tech/eu-copyright-law-may-force-google-facebook-to-pay-billions-to-music-companies-publishers.

(Continued)

*Primary Examiner* — Asher D Kells
(74) *Attorney, Agent, or Firm* — Yee & Associates, P. C.

(57) ABSTRACT

Hyperlink copyright infringement avoidance is provided. A hyperlink is identified in a post made by a user on a social media website. A review of the hyperlink is performed. An analysis of a post history of the user is performed. The hyperlink is removed from the post to form a sanitized post with a removed hyperlink based on at least one of the review of the hyperlink and the analysis of the post history of the user.

9 Claims, 4 Drawing Sheets

(56) References Cited

U.S. PATENT DOCUMENTS

| | | | | |
|---|---|---|---|---|
| 2011/0197114 | A1* | 8/2011 | Martin | H04L 51/214 715/205 |
| 2013/0218999 | A1* | 8/2013 | Martin | G06Q 10/10 709/224 |
| 2014/0280614 | A1* | 9/2014 | Alakuijala | H04L 51/52 709/206 |
| 2015/0096041 | A1* | 4/2015 | Bommireddipalli | G06F 21/10 726/26 |
| 2015/0143466 | A1* | 5/2015 | Zacher | H04L 63/10 726/4 |
| 2016/0085732 | A1* | 3/2016 | Boehler | G06F 40/134 715/207 |
| 2018/0091453 | A1* | 3/2018 | Jakobsson | H04L 63/1441 |
| 2018/0165463 | A1* | 6/2018 | McCreary | G06F 16/951 |
| 2018/0349571 | A1 | 12/2018 | Martinez et al. | |
| 2019/0306145 | A1 | 10/2019 | Santelia et al. | |
| 2020/0110858 | A1* | 4/2020 | Lyu | G06N 20/00 |
| 2020/0169536 | A1 | 5/2020 | Santelia et al. | |
| 2020/0184035 | A1 | 6/2020 | Santelia et al. | |
| 2021/0234870 | A1* | 7/2021 | Jakobsson | H04L 63/1441 |
| 2022/0014543 | A1* | 1/2022 | Jakobsson | H04L 63/1425 |
| 2022/0027407 | A1* | 1/2022 | Ikezoye | G06F 16/686 |
| 2022/0121984 | A1 | 4/2022 | Gupta et al. | |

OTHER PUBLICATIONS

Vincent, "EU Copyright Directive vote: Articles 11 and 13 approved," published Sep. 12, 2018, accessed Jul. 18, 2022, 20 pages. https://www.theverge.com/2018/9/12/17849868/eu-internet-copyright-reform-article-11-13-approved.

Wikipedia, "Directive on Copyright in the Digital Single Market," Wikimedia Foundation, Inc., accessed Jul. 18, 2022, 10 pages. https://en.wikipedia.org/wiki/Directive_on_Copyright_in_the_Digital_Single_Market.

Anonymous, "Secured HTTP Server-to-Client and Server-to-Server File Transfer with a Licensing Authority," An IP.com Prior Art Database Technical Disclosure, IPCOM000265077D, Feb. 22, 2021, 9 pages.

Gray, "Playing with Machines: Using Machine Learning to Understand Automated Copyright Enforcement at Scale," Big Data & Society, Apr. 28, 2020, 15 pages.

Enzell, "Global IP Infringement's Significant Cost to the U.S. Economy," Feb. 26, 2015, accessed Jul. 18, 2022, 2 pages. https://www.innovationfiles.org/global-ip-infringements-significant-cost-to-the-u-s-economy/.

* cited by examiner

HYPERLINK COPYRIGHT INFRINGEMENT AVOIDANCE

BACKGROUND

1. Field

The disclosure relates generally to hyperlinks and more specifically to removing a hyperlink, which accesses a website containing copyrighted material, from a post made by a user on a social media website to avoid copyright infringement issues.

2. Description of the Related Art

A hyperlink, electronic link, or link references content (e.g., data, information, document, picture, video, music, graphic, or the like) that a user wants to view by activating the hyperlink using, for example, a mouse click, screen tap, voice command, or the like. In other words, a hyperlink accesses content stored on, for example, a website, webpage, network server, intranet, internet, or the like. The hyperlink sends the user to a specific network address, such as, for example, a uniform resource locator, corresponding to the desired content. Thus, a user can utilize a hyperlink to connect to almost any content source having a network address.

SUMMARY

According to one illustrative embodiment, a computer-implemented method for hyperlink copyright infringement avoidance is provided. A computer identifies a hyperlink in a post made by a user on a social media website. The computer performs a review of the hyperlink. The computer performs an analysis of a post history of the user. The computer removes the hyperlink from the post to form a sanitized post with a removed hyperlink based on at least one of the review of the hyperlink and the analysis of the post history of the user. According to other illustrative embodiments, a computer system and computer program product for hyperlink copyright infringement avoidance are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
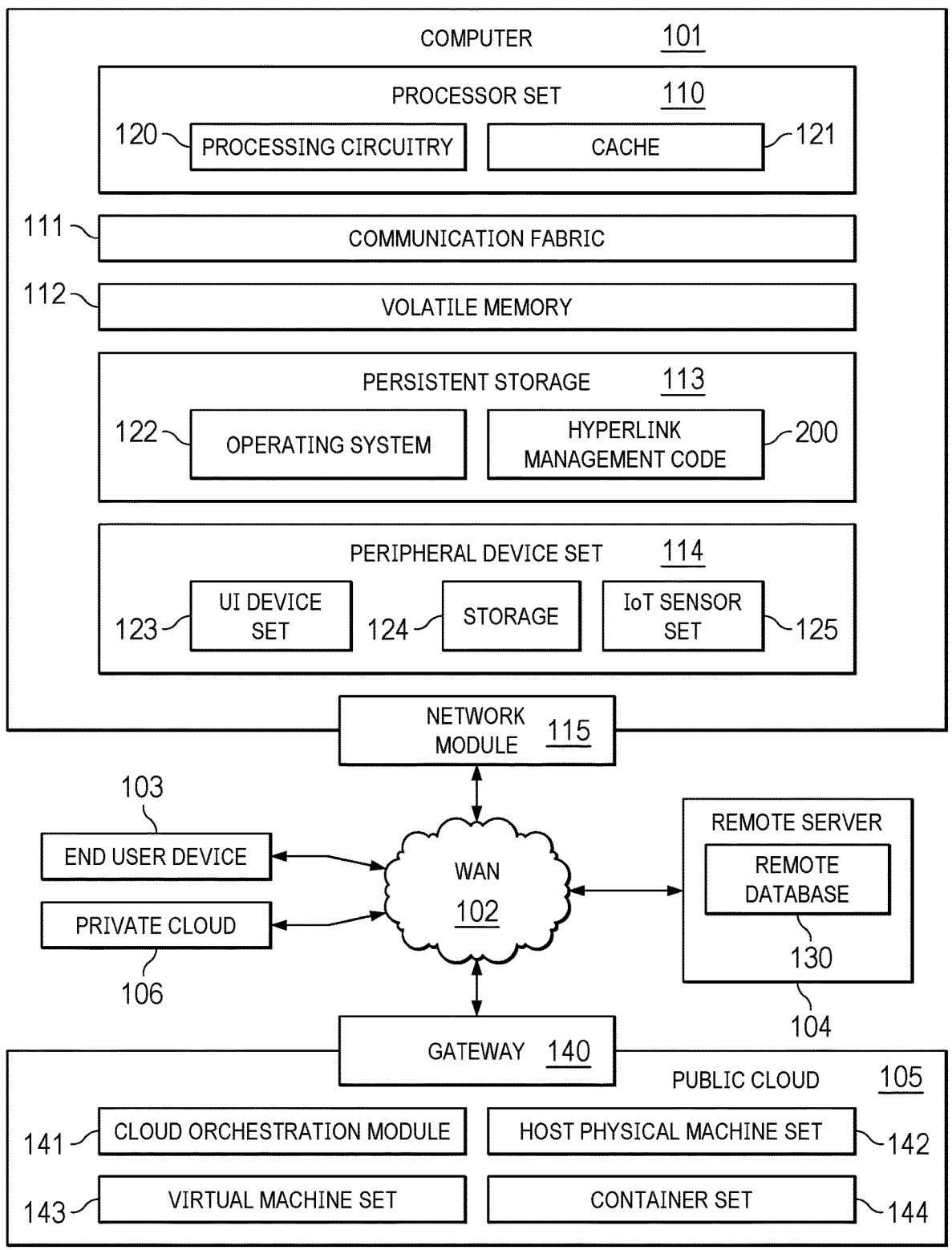
FIG. 1 is a pictorial representation of a computing environment in which illustrative embodiments may be implemented.
Figure 2:
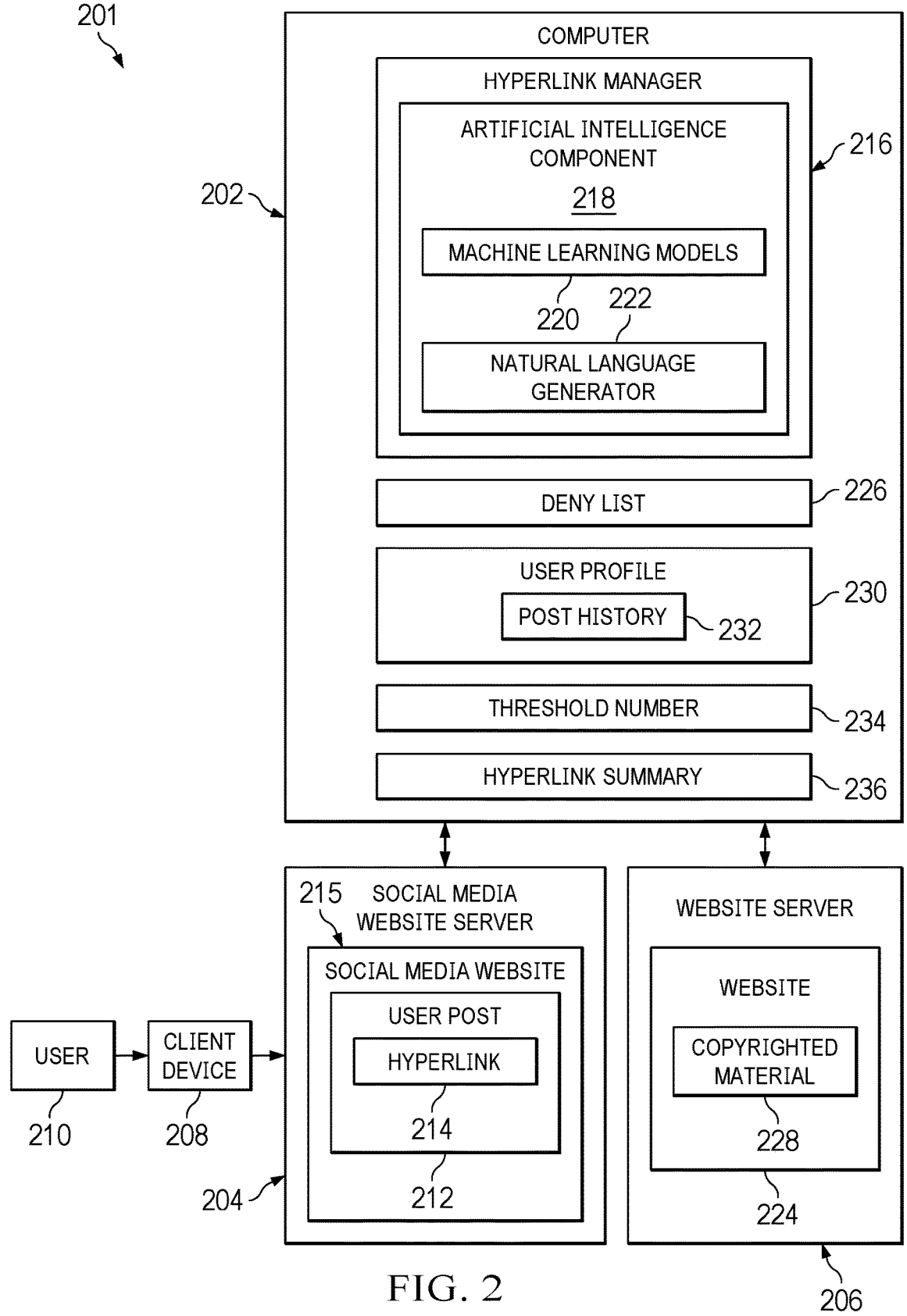
FIG. 2 is a diagram illustrating an example of a hyperlink management system in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods, such as hyperlink management code 200. Hyperlink management code 200 detects hyperlinks that access websites containing copyrighted material using a list of known websites containing copyrighted material. Moreover, hyperlink management code 200 also performs user vetting and machine learning to decrease the likelihood of publishing posts that include hyperlinks to websites containing copyrighted material that are not included in the list of known websites containing copyrighted material. In addition, hyperlink management code 200 sanitizes posts to display only a summary (e.g., relevant characteristics) corresponding to removed hyperlinks. As a result, hyperlink management code 200 protects the rights of the creators of copyrighted material, as well as protecting social media websites and any other social collaboration platform from regulatory implications of their users posting hyperlinks on their websites or platforms to copyrighted material.

In addition to hyperlink management code block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and hyperlink management code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in hyperlink management code block 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The hyperlink management code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 can represent a set of one or more different servers. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With the implementation of governmental regulations, such as, for example, the European Union Directive on Copyright in the Digital Single Market, Article 11, Protection of press publications concerning digital uses, a social media website (i.e., any social collaboration platform) can be held liable for copyright infringement when a user posts a link on that social media website to copyrighted content, such as, for example, a newspaper article. In other words, social media companies can either allow their users to share hyperlinks to copyrighted material and pay the copyright fees or prevent the sharing of hyperlinks and limit what users can share on their websites. The goal of these governmental regulations, such as the Directive, is to, for example, protect press publications, reduce the "value gap" between profits made by the social media websites and by the content creators, encourage collaboration between the social media websites and the content creators, and provide copyright fair use exceptions, such as, for example, text-mining and data-mining.

Illustrative embodiments filter out or remove a hyperlink to an information source, such as a website, which contains copyrighted material, from a post on a social media website. In addition, illustrative embodiments provide a summary of the removed hyperlink without accessing and displaying the copyrighted material, which would have been accessed by the hyperlink. As a result, illustrative embodiments avoid potential legal repercussions that can arise from copyright infringement.

Illustrative embodiments remove the hyperlink, which would enable copyright infringement, from a social media post prior to the hyperlink being published by the user on the social media website. Thus, illustrative embodiments protect users (e.g., individuals, businesses, companies, organizations, institutions, agencies, and the like) from inadvertently violating copyright laws and regulations by removing user-posted hyperlinks to copyrighted material, while also providing a summary of the removed hyperlink. For example, illustrative embodiments may summarize a removed hyperlink such as https://www/EU-copyright-laws.abc as EU copyright laws. Thus, illustrative embodiments evaluate content corresponding to a hyperlink prior to permitting the user to post the hyperlink on the social media website to sanitize the post when needed to prevent issues corresponding to copyright infringement.

Article 11 of the European Union Directive on Copyright forces social media companies to pay a fee when copyrighted material is accessed from their websites regardless of who posts a hyperlink to copyrighted material on their websites. By determining that a hyperlink will access copyrighted material and then summarizing content of the hyperlink, instead of just merely removing the hyperlink from the post, illustrative embodiments safeguard and protect users from inadvertent use of a hyperlink to a website containing material that is copyrighted, while still sharing summarized information corresponding to the removed hyperlink. The copyrighted material may be, for example, textual content, video content, picture content, graphic content, music content, or the like.

As an illustrative example, a user of social media website XYZ creates a post that contains a hyperlink to material or content located on an external website. Before the social media post is published (i.e., made public), illustrative embodiments identify that the post contains a hyperlink and initiate a hyperlink review process. During the hyperlink review process, illustrative embodiments determine whether publishing the post containing the hyperlink on social media website XYZ is permissible based on a set of criteria. The set of criteria includes, for example, reviewing a list of known websites containing copyrighted material, reviewing a user profile containing the user's history of posting hyperlinks to copyrighted material, using a machine learning model to predict whether the hyperlink will access copyrighted material, performing deferred hyperlink rechecking, and the like.

In the hyperlink review process, illustrative embodiments obtain from social media website XYZ a list (e.g., a deny list, block list, or the like) of known websites containing copyrighted material. Illustrative embodiments utilize the list of known websites containing copyrighted material to identify hyperlinks that will access these known websites in order to remove those hyperlinks from user posts on social media website XYZ. Further, illustrative embodiments can utilize, for example, a bot to access and search other social media websites to obtain the other social media websites' lists of known websites containing copyrighted material. Furthermore, illustrative embodiments can utilize the bot to access and analyze the terms and conditions (e.g., copyrighted material fair use policies) of different websites that may violate social media website XYZ's acceptable fair use policies of copyrighted material and add those websites to the list of known websites containing copyrighted material.

In the user history review process, illustrative embodiments retrieve and analyze a stored user profile that contains a history of how many times the user previously posted hyperlinks on social media website XYZ to copyrighted material and what the copyrighted material was. In other words, illustrative embodiments vet a hyperlink to be publicly posted by the user on social media website XYZ based on the user's past history of posting hyperlinks that accessed copyrighted material. For example, in response to illustrative embodiments determining that the user is known to frequently post hyperlinks to websites containing copyrighted material (e.g., posting hyperlinks to copyrighted material greater than or equal to a defined threshold number of user hyperlink postings to copyrighted material) based on a review of the user's profile, illustrative embodiments prevent publication of the posted hyperlink when illustrative embodiments determine that a high probability or likelihood exists that the user's posted hyperlink will access copyright material.

However, it should be noted that when a conflict exists between the hyperlink review process and the user history review process, illustrative embodiments assign a higher weight to the hyperlink review process. For example, the hyperlink review process indicates that a post containing a hyperlink can be published on social media website XYZ because the website, which will be accessed by the hyperlink, is not listed in the list of known websites containing copyrighted material and the user history review process indicates that the post containing the hyperlink should not be published on social media website XYZ because the user has previously posted hyperlinks to copyrighted material greater than the defined threshold number of user hyperlink postings to copyrighted material. In this case of conflicting results, illustrative embodiments will allow the post containing the hyperlink to be published on social media website XYZ because the website is not found in the list of known websites containing copyrighted material even though the user has previously posted too many hyperlinks to copyrighted material on social media website XYZ.

Furthermore, illustrative embodiments can also utilize a machine learning model to predict whether a hyperlink accesses copyrighted material or not. The machine learning model may utilize at least one of supervised, semi-supervised, or unsupervised learning. For supervised and semi-supervised learning, the machine learning model is trained using previous examples of hyperlinks that accessed websites containing copyrighted material. Moreover, illustrative embodiments can utilize another machine learning model to discern between fair use of copyrighted material and copyright infringement. This machine learning model is trained on previous examples of fair use of copyrighted material based on copyrighted material fair use policies.

Moreover, illustrative embodiments may optionally perform subsequent or deferred recheck, off-line re-validation, or the like, of the hyperlink to copyrighted material as copyright licensing conditions change over time. Illustrative embodiments can perform the deferred hyperlink recheck at a defined time interval, such as, for example, 1 month, 6 months, 1 year, or the like. Further, alternative illustrative embodiments may utilize another system, such as, for example, a content management system, to perform the deferred recheck of hyperlinks.

In response to illustrative embodiments determining that a posted hyperlink on social media website XYZ will access a website containing copyrighted material, illustrative embodiments sanitize or decontaminate the post by removing the hyperlink, which will access the website containing the copyrighted material, from that post. In addition, adjacent to where illustrative embodiments removed the hyperlink from the post, illustrative embodiments provide a summary of the removed hyperlink in plain text. The summary includes, for example, identifying characteristics, attributes, features, traits, or the like corresponding to the removed hyperlink such as title, author, hosting website's name, and the like. Illustrative embodiments can utilize natural language generation by an artificial intelligence component to generate the summary corresponding to the removed hyperlink.

After illustrative embodiments sanitize or decontaminate the post by removing the offending hyperlink, illustrative embodiments publish the post, which includes the generated summary corresponding to the removed hyperlink, on social media website XYZ for other users to review. Thus, illustrative embodiments protect social media website XYZ and the user from potential copyright infringement issues.

Thus, illustrative embodiments provide one or more technical solutions that overcome a technical problem with protecting copyrighted material located on computer networks. As a result, these one or more technical solutions provide a technical effect and practical application in the field of computer networks.

With reference now to FIG. 2, a diagram illustrating an example of a hyperlink management system is depicted in accordance with an illustrative embodiment. Hyperlink management system 201 may be implemented in a computing environment, such as computing environment 100 in FIG. 1. Hyperlink management system 201 is a system of hardware and software components for removing hyperlinks, which access websites containing copyrighted materials, from posts made by users on a social media website to avoid copyright infringement.

In this example, hyperlink management system 201 includes computer 202, social media website server 204, website server 206, and client device 208. Computer 202 may be, for example, computer 101 in FIG. 1. Social media website server 204 may be, for example, remote server 104 in FIG. 1. Website server 206 may be, for example, a second remote server 104 in FIG. 1 of a set of remote servers. Client device 208 may be, for example, EUD 103 in FIG. 1. However, it should be noted that hyperlink management system 201 is intended as an example only and not as a limitation on illustrative embodiments. In other words, hyperlink management system 201 may include any number of computers, servers, client devices, and other devices and components not shown.

In this example, user 210 utilizes client device 208 to submit user post 212, which includes hyperlink 214, to social media website 215, which is hosted by social media website server 204. In response to receiving user post 212 with hyperlink 214 on social media website 215, social media website server 204 sends user post 212 with hyperlink 214 to computer 202 for hyperlink copyright infringement review.

Computer 202 includes hyperlink manager 216. Hyperlink manager 216 may be implemented in hyperlink management code 200 in FIG. 1. Hyperlink manager 216 controls the process of determining whether hyperlinks contained in user posts on social media websites will access any copyrighted materials. In this example, hyperlink manager 216 includes artificial intelligence component 218. Artificial intelligence component 218 includes machine learning models 220 and natural language generator 222.

Artificial intelligence component 218 has intelligent behavior and can be based on the function of a human brain. Artificial intelligence component 218 comprises at least one of an artificial neural network, cognitive system, Bayesian network, fuzzy logic, expert system, natural language processing, or some other suitable system. Natural language processing enables a computer to read and understand human language. Some applications of natural language processing include information retrieval, text mining, machine translation, and text generation.

Machine learning can be used to train artificial intelligence component 218. Machine learning involves inputting data to the process and allowing the process to adjust and improve the function of artificial intelligence component 218, thereby increasing the performance of computer 202, itself.

Machine learning models 220 of artificial intelligence component 218 can learn without being explicitly programmed to do so. Machine learning models 220 represent a set of one or more different machine learning models. Machine learning models 220 can learn based on training data input into machine learning models 220. Machine learning models 220 can learn using various types of machine learning algorithms. The machine learning algorithms include at least one of supervised learning, semi-supervised learning, unsupervised learning, feature learning, sparse dictionary learning, association rules, or other types of learning algorithms. Examples of machine learning models 220 can include an artificial neural network, convolutional neural network, decision tree, support vector machine, Bayesian network, and other types of models. Machine learning models 220 can be trained using historical data corresponding to previous social media user posts that included hyperlinks to copyrighted materials, copyright fair use policies, and the like. Natural language generator 222 analyzes hyperlink text and generates plain text summaries of hyperlinks.

In response to computer 202 receiving user post 212 with hyperlink 214 from social media website server 204, hyperlink manager 216 utilizes natural language generator 222 to identify hyperlink 214 in user post 212. Then, hyperlink manager 216 determines that hyperlink 214 corresponds to website 224, which is hosted by website server 206. In response to determining that hyperlink 214 corresponds to website 224, hyperlink manager 216 retrieves deny list 226. Deny list 226 contains a list of known websites that contain copyrighted material. Computer 202 can obtain deny list 226 from social media server 204 and a plurality of other social media servers corresponding to different social media companies.

In this example, hyperlink manager 216 finds that website 224 is included in deny list 226. In other words, website 224 is known to contain copyrighted material, such as copyrighted material 228. Further, hyperlink manager 216 can also utilize artificial intelligence component 218 to predict whether website 224 contains copyrighted material 228.

Furthermore, hyperlink manager 216 retrieves and analyzes user profile 230, which corresponds to user 210. User profile 230 includes post history 232. Post history 232 contains the number of times user 210 previously made posts on social media website 215 that included hyperlinks to copyrighted materials. Hyperlink manager 216 compares the number of times user 210 previously posted hyperlinks to copyrighted materials to threshold number 234. Threshold number 234 is a predefined number of times a user can post hyperlinks to copyrighted materials, which excessing the predefined number of times indicates a high probability that hyperlink 214 posted by user 210 will access copyrighted material (i.e., copyrighted material 228).

Based on at least one of website 224 being found in deny list 226 indicating that website 224 contains copyrighted material 228 or post history 232 of user 210 indicating that the number of previous posts including hyperlinks to copyrighted material exceeds threshold number 234, hyperlink manager 216 removes hyperlink 214 from user post 212 to sanitize user post 212 and avoid potential copyright infringement by the social media company operating social media website 215. Moreover, hyperlink manager 216 utilizes natural language generator 222 to generate hyperlink summary 236. Hyperlink summary 236 contains relevant characteristics, such as, for example, title, date, author, source website name, and the like, corresponding to removed hyperlink 214. Hyperlink manager 216 inserts hyperlink summary 236 in user post 212 to replace removed hyperlink 214. Afterward, hyperlink manager 216 sends user post 212 with inserted hyperlink summary 236 back to social media website server 204 for publication on social media website 215 for other users of social media website 215 to view.

Figure 3:
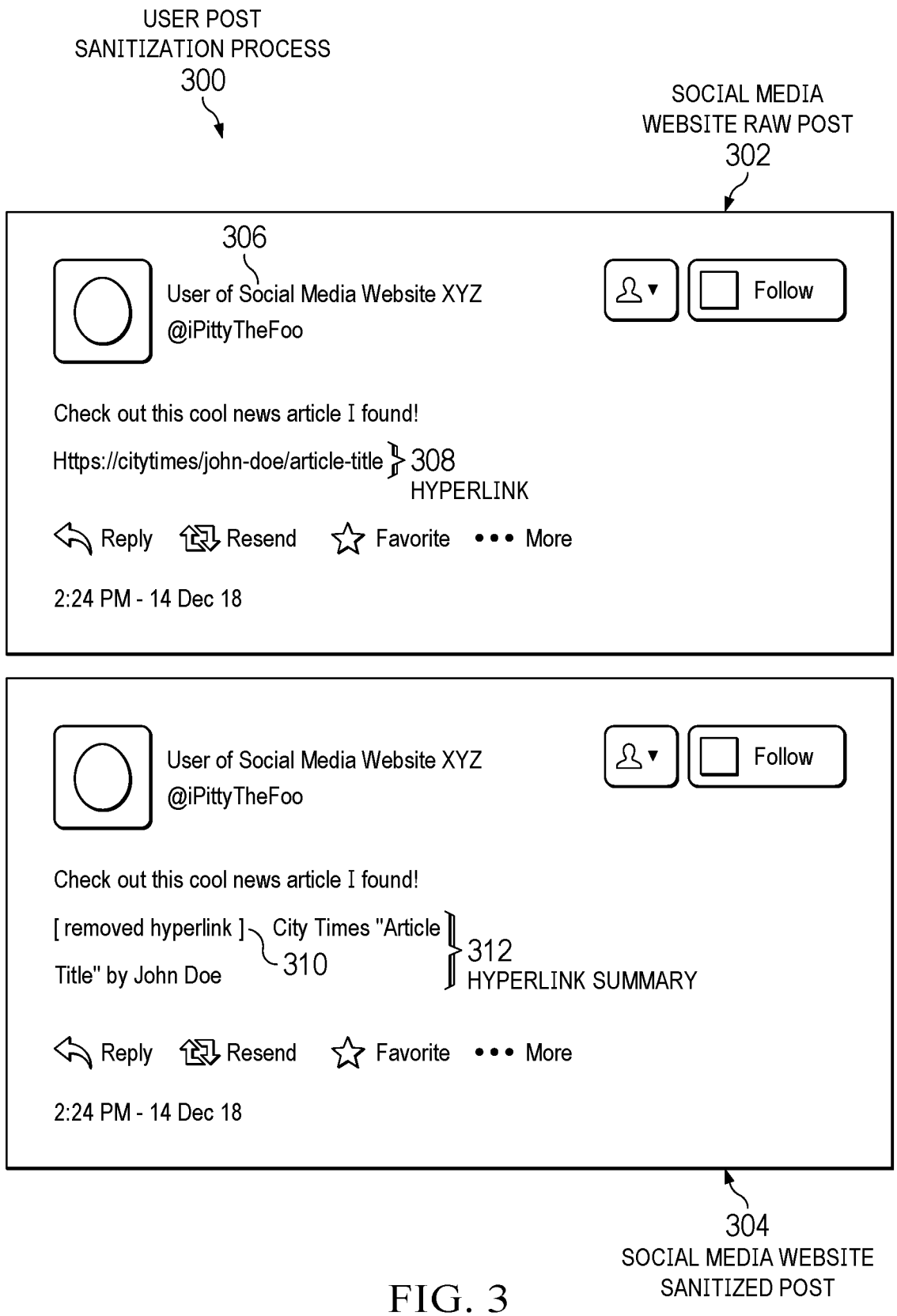
FIG. 3 is a diagram illustrating an example of a user post sanitization process in accordance with an illustrative embodiment.

With reference now to FIG. 3, a diagram illustrating an example of a user post sanitization process is depicted in accordance with an illustrative embodiment. User post sanitization process 300 may be implemented in a computer, such as, for example, computer 101 in FIG. 1 or computer 202 in FIG. 2. For example, user post sanitization process 300 may be implemented in hyperlink management code 200 in FIG. 1 or hyperlink manager 216 in FIG. 2.

In this example, user post sanitization process 300 includes social media website raw post 302 and social media website sanitized post 304. However, it should be noted that social media website raw post 302 and social media website sanitized post 304 are meant as examples only and not as limitations on illustrative embodiments. In other words, illustrative embodiments can perform user post sanitization process 300 on any type of social media or social collaboration post containing a hyperlink to copyrighted material.

User 306 posts social media website raw post 302 on social media website XYZ, such as, for example, social media website 215 in FIG. 2. User 306 and social media website raw post 302 may be, for example, user 210 and user post 212 in FIG. 2. Also, social media website raw post 302 includes hyperlink 308, such as, for example, hyperlink 214 in FIG. 2.

The social media website server hosting social media website XYZ sends social media website raw post 302 to the hyperlink manager for hyperlink copyright infringement review. In response to the hyperlink manager determining that hyperlink 308 will access copyrighted material, such as, for example, copyrighted material 228 in FIG. 2, the hyperlink manager removes hyperlink 308 from social media website raw post 302 to form removed hyperlink 310 in social media website sanitized post 304. Furthermore, the hyperlink manager inserts hyperlink summary 312 in social media website sanitized post 304 to replace removed hyperlink 310. Hyperlink summary 312 maintains the relevant characteristics of removed hyperlink 310.

Figure 4:
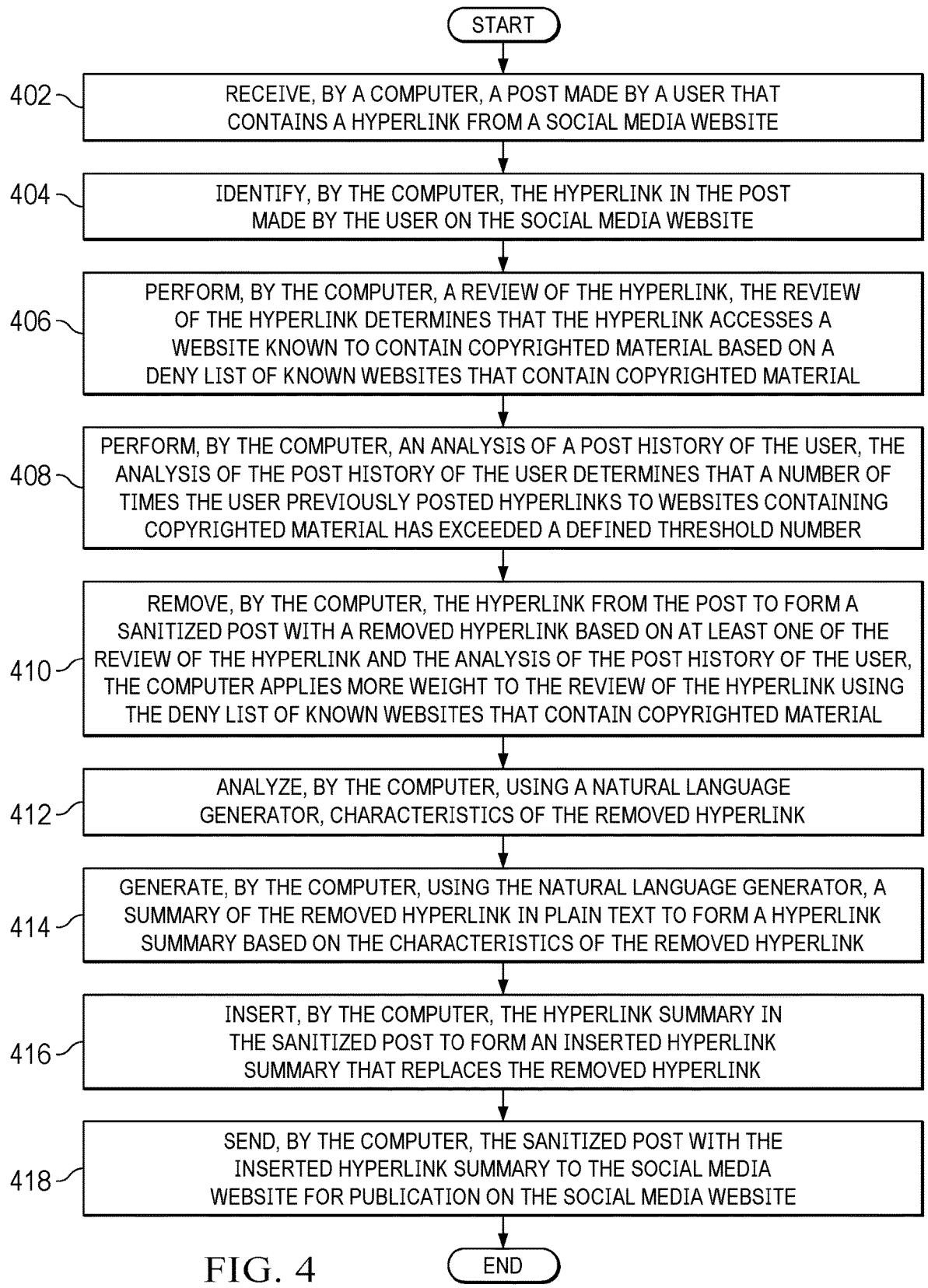
FIG. 4 is a flowchart illustrating a process for hyperlink copyright infringement avoidance in accordance with an illustrative embodiment.

With reference now to FIG. 4, a flowchart illustrating a process for hyperlink copyright infringement avoidance is shown in accordance with an illustrative embodiment. The process shown in FIG. 4 may be implemented in a computer, such as, for example, computer 101 in FIG. 1 or computer 202 in FIG. 2. For example, the process shown in FIG. 4 may be implemented in hyperlink management code 200 in FIG. 1 or hyperlink manager 216 in FIG. 2.

The process begins when the computer receives a post made by a user that contains a hyperlink from a social media website (step 402). The computer identifies the hyperlink in the post made by the user on the social media website (step 404).

The computer performs a review of the hyperlink (step 406). In this example, the review of the hyperlink determines that the hyperlink accesses a website known to contain copyrighted material based on a deny list of known websites that contain copyrighted material. The computer also performs an analysis of a post history of the user (step 408). In this example, the analysis of the post history of the user determines that a number of times the user previously posted hyperlinks to websites containing copyrighted material has exceeded a defined threshold number.

The computer removes the hyperlink from the post to form a sanitized post with a removed hyperlink based on at least one of the review of the hyperlink and the analysis of the post history of the user (step 410). When a conflict exists between the review of the hyperlink and the analysis of the post history of the user, the computer applies more weight to the review of the hyperlink using the deny list of known websites that contain copyrighted material. The computer, using a natural language generator, analyzes characteristics of the removed hyperlink (step 412). The computer, using the natural language generator, generates a summary of the removed hyperlink in plain text to form a hyperlink summary based on the characteristics of the removed hyperlink (step 414).

The computer inserts the hyperlink summary in the sanitized post to form an inserted hyperlink summary that replaces the removed hyperlink (step 416). The computer sends the sanitized post with the inserted hyperlink summary to the social media website for publication on the social media website (step 418). Thereafter, the process terminates.

Thus, illustrative embodiments of the present invention provide a computer-implemented method, computer system, and computer program product for removing a hyperlink, which accesses a website containing copyrighted material, from a post made by a user on a social media website to avoid copyright infringement penalties. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for hyperlink copyright infringement avoidance, the computer-implemented method comprising:
   receiving, by a computer from a social media website via a network, a post made by the user that contains a hyperlink, wherein the user made the post containing the hyperlink on the social media website;
   identifying, by a hyperlink manager of the computer, the hyperlink in the post made by the user on the social media website;
   performing, by the hyperlink manager of the computer, a review of the hyperlink;
   performing, by the hyperlink manager of the computer, an analysis of a post history of the user, wherein the post history comprises a number of times the user previously made posts on the social media website that included hyperlinks to copyrighted materials;
   removing, by the hyperlink manager of the computer, the hyperlink from the post to form a sanitized post with a removed hyperlink based on at least one of the review of the hyperlink and the analysis of the post history of the user;
   analyzing, by the computer, characteristics of the removed hyperlink;
   generating, by the computer, a summary of the removed hyperlink in plain text to form a hyperlink summary based on the characteristics of the removed hyperlink;
   inserting, by the computer, the hyperlink summary in the sanitized post to form an inserted hyperlink summary that replaces the removed hyperlink; and
   sending, by the computer via the network, the sanitized post with the inserted hyperlink summary to the social media website for publication on the social media website, wherein the computer applies more weight to the review of the hyperlink in response to a conflict existing between the review of the hyperlink and the analysis of the post history of the user.

2. The computer-implemented method of claim 1, wherein the review of the hyperlink determines that the hyperlink references a website known to contain copyrighted material based on a list of known websites that contain copyrighted material.

3. The computer-implemented method of claim 1, wherein the analysis of the post history of the user determines whether the number of times the user previously made the posts on the social media website that included hyperlinks to the copyrighted materials has exceeded a defined threshold number.

4. The computer-implemented method of claim 1, wherein the computer performs a deferred recheck of the hyperlink at a defined time interval.

5. A computer system for hyperlink copyright infringement avoidance, the computer system comprising:
   a communication fabric;
   a storage device connected to the communication fabric, wherein the storage device stores program instructions; and
   a processor connected to the communication fabric, wherein the processor executes the program instructions to:
      receive, by the computer system from a social media website via the communication fabric, a post made by a user that contains a hyperlink, wherein the user made the post containing the hyperlink on the social media website;
      identify, by a hyperlink manager of the computer system, the hyperlink in the post made by the user on the social media website;
      perform, by the hyperlink manager of the computer system, a review of the hyperlink;
      perform, by the hyperlink manager of the computer system, an analysis of a post history of the user, wherein the post history comprises a number of times the user previously made posts on the social media website that included hyperlinks to copyrighted materials;
      remove, by the hyperlink manager of the computer system, the hyperlink from the post to form a sanitized post with a removed hyperlink based on at least one of the review of the hyperlink and the analysis of the post history of the user;
      analyze characteristics of the removed hyperlink;
      generate a summary of the removed hyperlink in plain text to form a hyperlink summary based on the characteristics of the removed hyperlink;
      insert the hyperlink summary in the sanitized post to form an inserted hyperlink summary that replaces the removed hyperlink; and
      send the sanitized post with the inserted hyperlink summary to the social media website via the network for publication on the social media website, wherein the computer applies more weight to the review of the hyperlink in response to a conflict existing between the review of the hyperlink and the analysis of the post history of the user.

6. The computer system of claim 5, wherein the review of the hyperlink determines that the hyperlink references a website known to contain copyrighted material based on a list of known websites that contain copyrighted material.

7. A computer program product for hyperlink copyright infringement avoidance, the computer program product comprising a computer-readable storage medium having program instructions embodied therewith, the program instructions executable by a computer to cause the computer to perform a method of:
   receiving, by the computer from a social media website via a network, a post made by a user that contains a hyperlink, wherein the user made the post containing the hyperlink on the social media website;
   identifying, by a hyperlink manager of the computer, the hyperlink in the post made by the user on the social media website;
   performing, by the hyperlink manager of the computer, a review of the hyperlink;

performing, by the hyperlink manager of the computer, an analysis of a post history of the user, wherein the post history comprises a number of times the user previously made posts on the social media website that included hyperlinks to copyrighted materials;

removing, by the hyperlink manager of the computer, the hyperlink from the post to form a sanitized post with a removed hyperlink based on at least one of the review of the hyperlink and the analysis of the post history of the user;

analyzing, by the computer, characteristics of the removed hyperlink;

generating, by the computer, a summary of the removed hyperlink in plain text to form a hyperlink summary based on the characteristics of the removed hyperlink;

inserting, by the computer, the hyperlink summary in the sanitized post to form an inserted hyperlink summary that replaces the removed hyperlink; and sending, by the computer via the network, the sanitized post with the inserted hyperlink summary to the social media website for publication on the social media website, wherein the computer applies more weight to the review of the hyperlink in response to a conflict existing between the review of the hyperlink and the analysis of the post history of the user.

8. The computer program product of claim 7, wherein the review of the hyperlink determines that the hyperlink references a website known to contain copyrighted material based on a list of known websites that contain copyrighted material.

9. The computer program product of claim 7, wherein the analysis of the post history of the user determines whether the number of times the user previously made the posts on the social media website that included the hyperlinks to the copyrighted materials has exceeded a defined threshold number.

* * * * *